(12) United States Patent
Kuiper et al.

(10) Patent No.: US 10,451,650 B2
(45) Date of Patent: Oct. 22, 2019

(54) SCANNING PROBE MICROSCOPY SYSTEM FOR MAPPING NANOSTRUCTURES ON A SURFACE OF A SAMPLE AND METROLOGY FRAME THEREFORE

(71) Applicant: Nederlandse Organisatie voor toegepast-natuurwetenschappelijk onderzoek TNO, 's-Gravenhage (NL)

(72) Inventors: Stefan Kuiper, 's-Gravenhage (NL); William Edward Crowcombe, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 15/744,289

(22) PCT Filed: Jul. 14, 2016

(86) PCT No.: PCT/NL2016/050517
§ 371 (c)(1),
(2) Date: Jan. 12, 2018

(87) PCT Pub. No.: WO2017/010880
PCT Pub. Date: Jan. 19, 2017

(65) Prior Publication Data
US 2018/0203038 A1  Jul. 19, 2018

(30) Foreign Application Priority Data

Jul. 15, 2015 (EP) ..................................... 15176899

(51) Int. Cl.
*G01Q 30/20* (2010.01)
*G01Q 70/04* (2010.01)

(52) U.S. Cl.
CPC ............. *G01Q 30/20* (2013.01); *G01Q 70/04* (2013.01)

(58) Field of Classification Search
CPC ........ G01Q 30/20; G01Q 60/00; G01Q 70/02; G01Q 70/04
See application file for complete search history.

(56) References Cited

U.S. PATENT DOCUMENTS 5,103,095 A   4/1992  Elings et al.
6,193,199 B1  2/2001  Karam, II
(Continued)

FOREIGN PATENT DOCUMENTS

CN        102384986 A     3/2012
WO    WO 2015/019090 A1   2/2015

OTHER PUBLICATIONS

European Patent Office, International Search Report in corresponding International Application No. PCT/NL2016/050517 dated Oct. 10, 2016 (2 pages).

*Primary Examiner* — Eliza W Osenbaugh-Stewart
(74) *Attorney, Agent, or Firm* — Leydig, Voit & Mayer, Ltd.

(57) ABSTRACT

A scanning probe microscopy system for mapping nanostructures on a surface of a sample, comprises a metrology frame, a sensor head including a probe tip, and an actuator for scanning the probe tip relative to the sample surface. The system comprises a clamp for clamping of the sample, which clamp is fixed to the metrology frame and arranged underneath the sensor head. The clamp is arranged for locally clamping of the sample in a clamping area underneath the probe tip, the clamping area being smaller than a size of the sample such as to clamp only a portion of the sample. Moreover, a metrology frame for use in scanning probe microscopy system as described includes a clamp for clamp- (Continued)

ing of a sample, wherein the clamp is fixed to the metrology frame such as to be arranged underneath the sensor head.

16 Claims, 3 Drawing Sheets

(56) References Cited

U.S. PATENT DOCUMENTS

| | | | |
|---|---|---|---|
| 6,201,401 B1* | 3/2001 | Hellemans | G01R 31/2648 257/E21.531 |
| 7,644,447 B2 | 1/2010 | Park et al. | |
| 2008/0151212 A1* | 6/2008 | Bleeker | G03F 7/707 355/72 |
| 2010/0017920 A1 | 1/2010 | Park et al. | |

* cited by examiner

SCANNING PROBE MICROSCOPY SYSTEM FOR MAPPING NANOSTRUCTURES ON A SURFACE OF A SAMPLE AND METROLOGY FRAME THEREFORE

CROSS-REFERENCE TO RELATED APPLICATIONS

This patent application is a U.S. National Phase of PCT International Application No. PCT/NL2016/050517, filed Jul. 14, 2016, which claims priority to European Application No. 15176899.1, filed Jul. 15, 2015, which are both expressly incorporated by reference in their entireties, including any references contained therein.

FIELD OF THE INVENTION

The present invention is directed at a scanning probe microscopy system for mapping nanostructures on a surface of a sample, the system comprising a metrology frame, a sample support structure for supporting a sample, a sensor head including a probe tip, and an actuator for scanning the probe tip relative to the sample surface for mapping of the nanostructures. The invention is further directed at a metrology frame for use in a system as above.

BACKGROUND

The present document relates to scanning probe microscopy systems (SPM), such as atomic force microscopy systems (AFM). In conventional scanning probe microscopy systems for investigating the surfaces of samples, such as wafers, the sample is held in place by a sample support structure during scanning of the probe. For example, if the sample is a wafer, the wafer may be clamped onto a chuck. The chuck is mounted on a coarse positioner, which positions the wafer such that the area to be investigated on the sample surface is arranged underneath the scanning probe. Next, the probe tip approaches the surface and scanning commences.

Although the above works well for many applications, it does provide some drawbacks that limit application of the technique in particular circumstances. For example, one of these drawbacks relates to thermal expansion of components, which puts constraints on the achievable accuracy. However, not only the system itself, but also the sample is subject to thermal expansion. This particularly becomes problematic for larger samples, e.g. 300 mm wafers. As may be appreciated, if structures on the surface of the sample are to be mapped on nanometer scale, even the smallest temperature variation may result in an unacceptable inaccuracy in the measurement.

SUMMARY OF THE INVENTION

It is an object of the present invention to provide scanning microscopy system wherein the abovementioned disadvantages have been overcome, and which allows for highly accurate sensing on nanometer scale.

To this end, there is provided herewith a scanning probe microscopy system for mapping nanostructures on a surface of a sample, the system comprising a metrology frame, a sample support structure for supporting a sample, a sensor head including a probe tip, and an actuator for scanning the probe tip relative to the sample surface for mapping of the nanostructures, wherein the system comprises a clamp for clamping of the sample, and wherein the clamp is fixed to the metrology frame and arranged underneath the sensor head, wherein the clamp is arranged for locally clamping of the sample in a clamping area underneath the probe tip, the clamping area being smaller than a size of the sample such as to clamp only a portion of the sample.

In accordance with the present invention by locally clamping the sample in a clamping area underneath the sensing head, the center of thermal expansion will be known and fixed to the clamping area. Because the clamp is fixed to the metrology frame, this center point for thermal expansion is likewise fixed with respect to the metrology frame. Hence, thermal expansion is excluded as a source of disturbance within the system because the metrology loop (i.e. from the measuring area via the metrology loop and the sensing head to the probe) will include this center for thermal expansion.

In accordance with some embodiments, the clamp is arranged underneath the sensor head such that a measurement axis through the probe tip and transverse to the sample crosses the clamping area. This ensures that the clamping area always is included by the metrology loop. The clamping area preferably is of relatively small size as compared to the wafer. In particular, the desired accuracy for the system and the thermal expansion coefficient of the material of the sample will set an upper limit for the size of the clamping area. Preferably, the clamping area will be of a size well below this upper limit. In general, it has been found that preferably the clamp has a size such that the clamping area on the sample is of a same size as an area to be scanned on the sample surface in use for mapping of said nanostructures. Alternatively, or in addition, the clamp may have a size such that the clamping area on the sample has a diameter in cross section within a range between 1 millimeter and 60 millimeter, preferably between 20 millimeter and 50 millimeter, more preferable between 25 millimeter and 40 millimeter, such as 30 millimeter. These ranges are also typically (but not exclusively) applicable where the sample is a silicon wafer, for example.

In accordance with some further embodiments, the system further comprises a sample support structure for supporting a sample, the sample support structure comprising a plurality of support struts, wherein the clamp is arranged for clamping at a first lateral stiffness, and wherein the support struts are arranged for supporting the sample at a second lateral stiffness lower than the first lateral stiffness. These embodiments are advantageous for large samples. The sample will be clamped by the clamp underneath the sensing head, while being further supported by the struts on the support structure. However, as will be appreciated, the struts must be designed in such a manner relative to the clamp, that they do allow the sample to expand without causing the center of thermal expansion to shift. Therefore, as defined above, the clamp is arranged for clamping at a first lateral stiffness, whereas the support struts are arranged for supporting the sample at a second lateral stiffness lower than the first lateral stiffness. This causes the center of thermal expansion to remain fixed to the clamping area.

Preferably, and in accordance with some embodiments, the support struts are arranged on the sample support structure such as to support the sample outside the clamping area, e.g. for allowing large samples to be supported (e.g. 300 mm wafers). The support struts may include at least one element of a group comprising: support burls, support knobs, or flexible or rigid support poles. The struts may for example include a flexible material, or may include a rubber or flexible tip. In other embodiments, the ends or tips of the struts may be smooth and rigid to allow lateral slipping of the sample. A combination of these measures is also possible, e.g. flexible poles having smooth rigid tips.

In accordance with some embodiments, the system further comprises a sample positioner for positioning of the sample on the clamp, wherein the sample positioner is external to a metrology loop, wherein the metrology loop is a virtual path going from the clamping area via the clamp and the metrology frame to the sensing head and the probe tip. The use of a sample positioner which is arranged outside the metrology loop further excludes sources of inaccuracy. In particular, the external sample positioner allows to position the sample onto the clamp, which is fixed to the metrology loop. Conventional SPM systems in many cases apply a coarse positioner underneath a substrate table, which thereby becomes part of the metrology loop. By this any inaccuracies or sources of disturbance within the coarse positioner likewise become part of the metrology loop; for example differences in thermal expansion characteristics between different parts of the coarse positioner, play between parts, or vibrations caused by operation of the positioner. Such sources of inaccuracy are excluded by applying the external positioner that may pick up the sample and position it onto the clamp. Moreover, the use of an external sample positioner that is external to the metrology loop renders the direct fixing of the clamp onto the metrology frame (for making it part of the metrology loop) more easy. In a further embodiment thereof, the sample positioner is external to the sample support structure and separated therefrom. Moreover, the positioning arm may even be completely separate from the metrology frame, e.g. being a completely separate and individual part of the system. In yet other such embodiments the sample positioner comprises a robotic arm for positioning of the sample on the sample support structure. However, as may be appreciated, various alternative designs for the sample positioner may be suitable, including for example—but not limited to—one or more (or a system of) robotic arms, or a movable table or support that is retracted underneath the sample upon clamping to the clamp. In a further embodiment, the sample support structure comprises one or more lifting pins for enabling lifting of the sample such as to allow gripping of the sample by the sample positioner or robotic arm. Lifting of the sample using lifting pins would allow an end-effector of a robotic arm to move underneath the sample. In some embodiments, one or more of the earlier described support struts form the lifting pins, although the system may alternatively or in addition be equipped with dedicated lifting pins.

In other embodiments of the invention, the clamp is of a material having a same or similar thermal expansion coefficient as the sample, or wherein the clamp is a silicon carbide clamp. Silicon carbide clamps are a preferential class of clamps in case the samples to be analyzed are mostly or exclusively silicon wafers. The thermal expansion coefficient of the clamp is the same as that of the wafer, and as a result, variations in the size and dimension of the clamp as a result of temperature variations during scanning are the same as the size variations within the clamping area on a silicon wafer sample. Hence, the location of the center of thermal expansion remains fixed and no stress is exerted on the sample as a result of differences in thermal expansion. Of course, the present invention is not limited to application in the field of analysis of silicon wafers, but may be applied in any type of scanning probe microscopy system for any purpose, in particular where highly accurate mapping of structures on nanometer scale is desired. In general, if a particular type of sample material is used, the material of the which the clamp is made may be selected to match the sample material in the sense that the coefficient of thermal expansion of the clamp material is similar (preferably equal) to that of the sample material. This may not always be possible, as will be appreciated. In some embodiments, the clamp may be fixed to the metrology frame in such a manner that it may be easily replaced between use of the system to match the clamp with the sample to be scanned.

In other embodiments of the invention, the clamp is a suction clamp for clamping the sample by means of suction. The use of a suction clamp, for example in combination with a robotic arm type external positioner provides a convenient implementation of the invention that allows placement and replacement of the sample on the clamp in a fast and non-destructive manner. Moreover, suction force can be accurately controlled by controlling the pressure within the clamp during clamping. This allows to control the lateral stiffness provided by the clamp such as to ensure that it is larger than, for example, the lateral stiffness of supporting the sample by the support struts of the support structure, as described above.

In other embodiments of the invention, the sample support structure is external to the metrology frame. In addition to maintaining the lateral stiffness provided by the clamp to be larger (controlling it to be larger) than the lateral stiffness provided by the support structure, excluding the sample support structure from the metrology loop or even from the metrology frame provides a further decoupling of parts in the system that excludes sources of inaccuracy from the measurement. For example, due to the separation of these parts, vibrations in the support structure or thermal expansion of the structure is not passed on to the metrology frame, but is excluded. Advantageously, the sample support structure will not be part of the metrology loop (e.g. sample area—clamp—metrology frame—sensor head—probe). Preferably, however, the support structure is not fixed to the metrology frame at all to prevent passing disturbances on via the frame.

In a second aspect of the invention, there is provided a metrology frame for use in scanning probe microscopy system according to any of the previous claims, the system comprising in addition to the metrology frame, a sensor head including a probe having a probe tip, and an actuator for scanning the probe tip relative to the sample surface for mapping of the nanostructures, wherein the metrology frame includes a clamp for clamping of a sample, wherein the clamp is fixed to the metrology frame and for being arranged underneath the sensor head.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
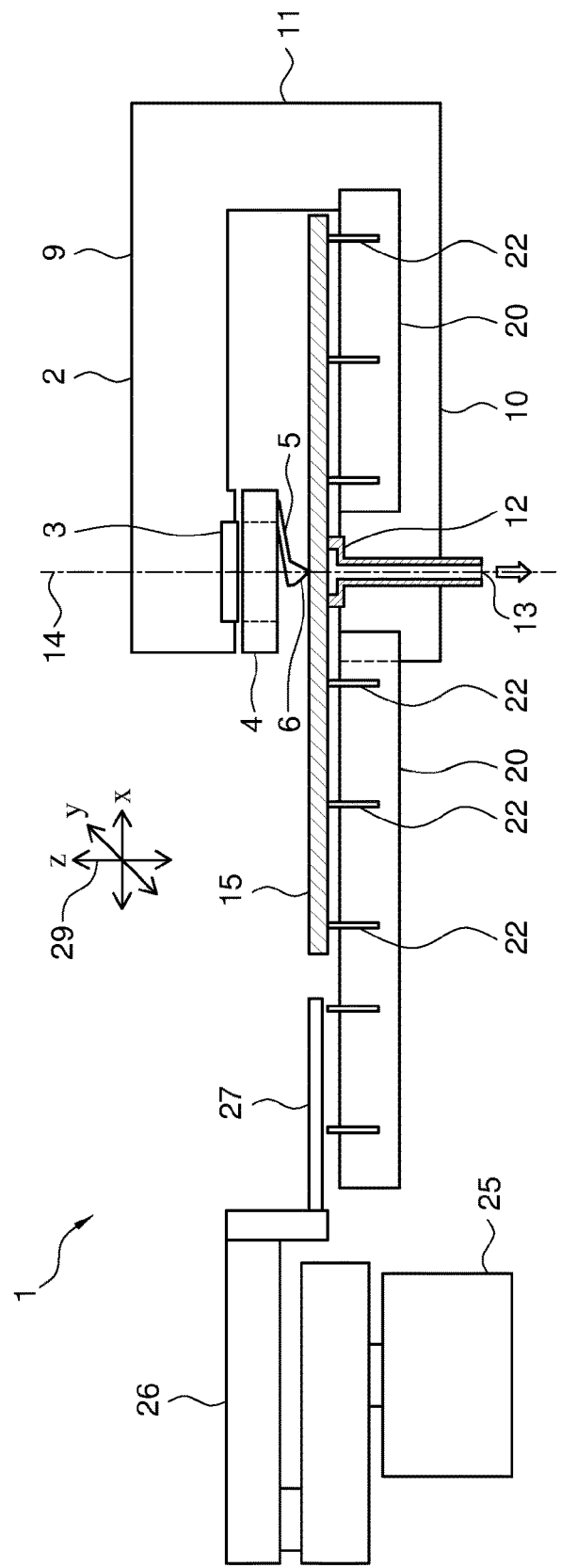
FIG. 1 schematically illustrates a side cross sectional view of a scanning probe microscopy system in accordance with the present invention.

A system in accordance with the present invention is schematically illustrated in a cross sectional side view in FIG. 1. The scanning probe microscopy system 1 comprises a metrology frame 2 comprising, as illustrated, at least an upper arm 9 and lower arm 10. The upper arm 9 comprises a sensor head 4 mounted on an actuator 3. The actuator 3 enables scanning of the probe 5 of the sensor head 4 across the surface of a sample 15. For example, with reference to the coordinate system 29 schematically illustrated in FIG. 1, the actuator may allow scanning of the probe 5 of the sensor head 4 in the x and y direction. Additionally, the actuator 3 may be arranged for lowering the probe 5, in particular the probe tip 6 thereof, towards the surface of the sample 15. In that case, the actuator 3 is also arranged for moving the sensor head 4, or at least the probe 5 thereof, in the z direction.

The system further comprises a sample support structure 20. The sample support structure 20, as illustrated in FIG. 1, is arranged for supporting the sample 15 across the surface thereof. To this end, the sample support structure 20 comprises a plurality of burls 22 that support the sample 15 from underneath. Preferably, the sample 15 is supported by the burls 20 without clamping or fixing thereto. In particular, the sample 15 may be supported by gravitation of force only.

In accordance with the present invention, a clamp 12 is fixed to the lower arm 10 of the metrology frame 2. The clamp 12 locally clamps the sample 15 to the metrology frame 2. The clamping of the sample 15 is only performed locally underneath the sensing head 4. In particular, a measurement axis 14 that goes straight through a clamping area provided by the clamp 12 and through the sensing head 4, illustrates that the clamping is only achieved in a direct vicinity of this measurement axis 14. A large part (i.e. most) of the sample 15 is not clamped. Optionally, as is done in FIG. 1, this unsupported part of the sample 15 may be supported by further supporting means; e.g. such as burls 22, a gas bearing or a table.

The clamp 12 may for example comprise a suction clamp, and clamping is achieved by suction from outlet 13 to create a low pressure area underneath the sample 15 within the clamp 12. The use of a suction clamp 12 allows convenient clamping of the sample 15, but also allows to control the clamping force provided by the clamp 12 by controlling the pressure inside the clamp 12. In accordance with the teachings of the present invention, the lateral stiffness provided by the clamp 12 (i.e. the stiffness of the clamping with respect to the directions parallel to the sample surface 15) is larger than the lateral stiffness provided by the burls 22. In embodiments including such burls 22, this lateral stiffness requirement is important to ensure that the center of thermal expansion is arranged within the clamping area provided by the clamp 12. The center of thermal expansion is the midpoint of the thermal expansion, i.e. the point that remains fixed at all times regardless of any temperature change of the sample 15. As will be appreciated, if the temperature of the sample 15 rises, the material will expand in accordance with the thermal expansion coefficient. As a result, and particularly detectable of a nanometer scale, the expansion will move any point on the surface of the wafer 15 radially outward relative to the center of thermal expansion. The magnitude of the displacement of each point is dependent on the distance between the respective point and the center of thermal expansion. By using a local clamp 12 which locally clamps the sample 15 underneath the sensor head 4 and the probe tip 6, the center of thermal expansion can be fixed to the clamping area provided by the clamp 12. As a result, any displacement within the measurement area (which is directly in the vicinity of the center of thermal expansion) will at utmost be of limited magnitude. Thus, within the measurement area, due to the absence of errors due to thermal expansion, a higher measurement accuracy is obtainable. Displacement of any points that are remote from the clamp 12 may be much larger, however these points lie outside the measurement area and therefore have no relevancy to the measuring by the probe.

Further illustrated in FIG. 1 is the external positioner system 25 comprising a robotic arm 26 and a gripper 27. The gripper 27 allows to pick up the sample 15 and place it differently underneath the sensor head to allow scanning of different measurement area. In the embodiment in FIG. 1, use is made of an external positioning system 25. The external positioning system 25 comprises a robotic arm 26 equipped with a gripper 27 for picking up the sample 15 and repositioning it on the clamp 12. By using an external positioner, which is at least external to a metrology loop through the metrology frame 2, any sources of disturbance that relate to the positioning system can be excluded from the measurement. Moreover, by using the external positioning system 25, the sample 15 may be clamped directly onto the metroframe by using the clamp 12 mounted on the metrology frame 2.

A further source of error that is excluded from the measurement as a result of clamping the sample 15 directly underneath the measurement area, and only in the direct vicinity thereof, comes from the fact that the length of the metrology loop through the upper arm 9 of the metrology frame 2 to the probe tip 6 is equal to the length of the metrology loop through the lower arm 10 of the metrology frame to the clamp 12. As a result, thermal expansion of the upper arm 9 of the section between the right portion 11 of the metrology frame towards its distal and where the sensor head 4 is mounted, is equally compensated by thermal expansion of the lower arm 10. Moreover, the metrology frame may be an integral part of a homogeneous material. The material of the frame may be such as to be low sensitive to temperature gradients. In particular, such material comprise a relatively low thermal expansion coefficient while having a high thermal conductivity. Examples of such suitable materials are lithium aluminosilicate glass-ceramics such as Zerodur® (manufactured by Schott AG of Mainz, Germany), silicon carbide, nickel-iron alloys such as Invar (FeNi36 (invented by Charles Édouard Guillaume in 1896)), and aluminum. However, the invention is not limited to either one of these examples, and other material may be likewise suitable for the specified purpose.

Figure 2:
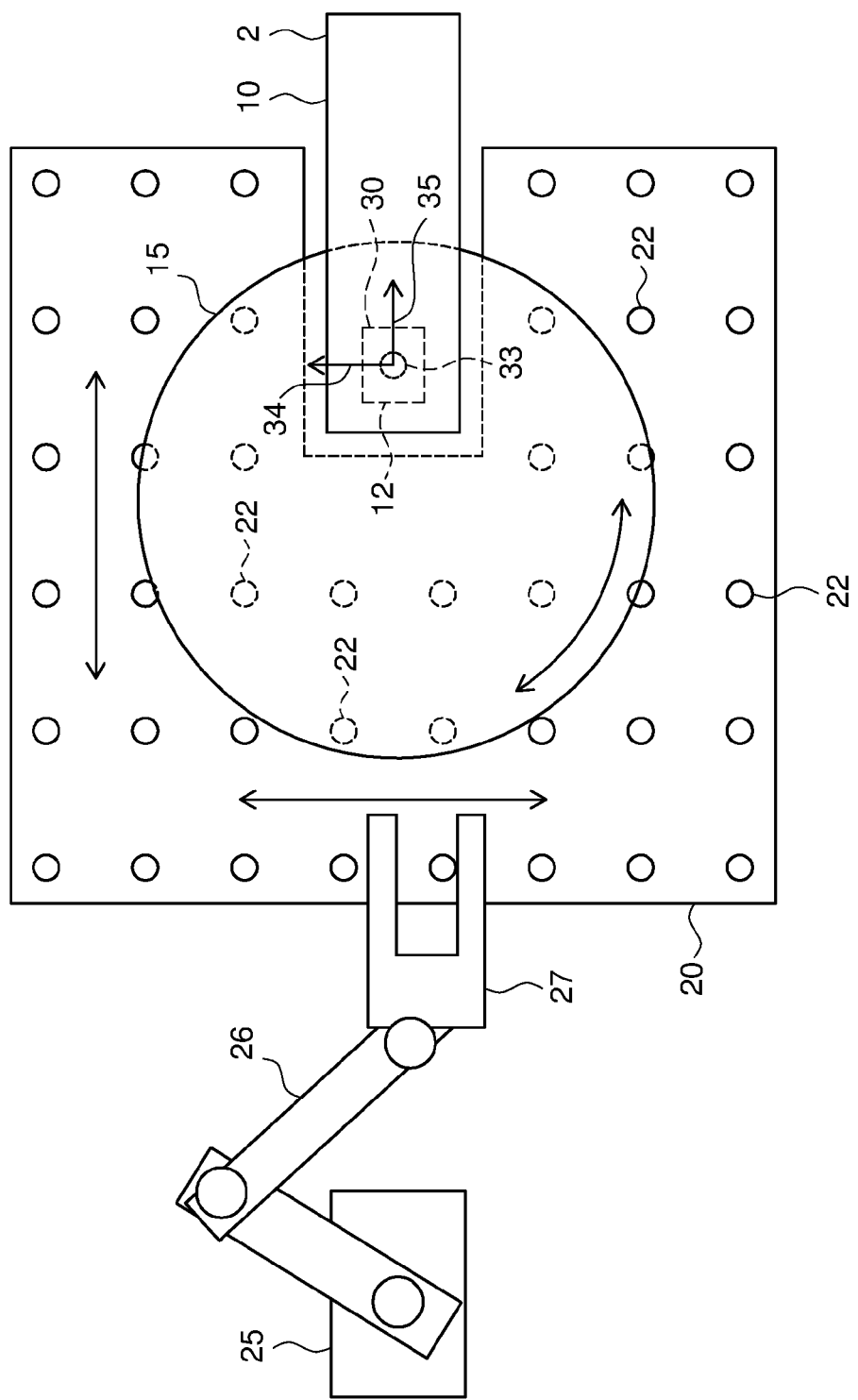
FIG. 2 schematically illustrates a top view of a scanning probe microscopy system of the present invention.

A top view of a scanning probe microscopy system in accordance with the present invention is schematically illustrated in FIG. 2. In FIG. 2, the positioning system 25 with the robotic arm 26 and gripper 27 are schematically illustrated. A sample support structure 20 comprising a plurality of burls 22 supports wafer 15. The wafer 15 rests on the tips of each of the burls 22 underneath it. For simplicity, only few of the burls have been indicated by means of reference numerals 22. The lower arm 10 of the metrology frame 2 is schematically illustrated comprising the clamp 12 defining the clamping area 30. The clamping area 30 only covers a small portion of the total wafer surface. The center of thermal expansion 33 is located within the clamping area 30 as a result of the local clamping by the clamp 12. Any expansion (schematically illustrated by arrow 34 and 35) will only be of very limited magnitude in the clamping area 30. Therefore, as a result of the local clamping, error caused by thermal expansion of the wafer 15 is sufficiently kept within limits to allow the measurements to be performed at high accuracy.

Figure 3:
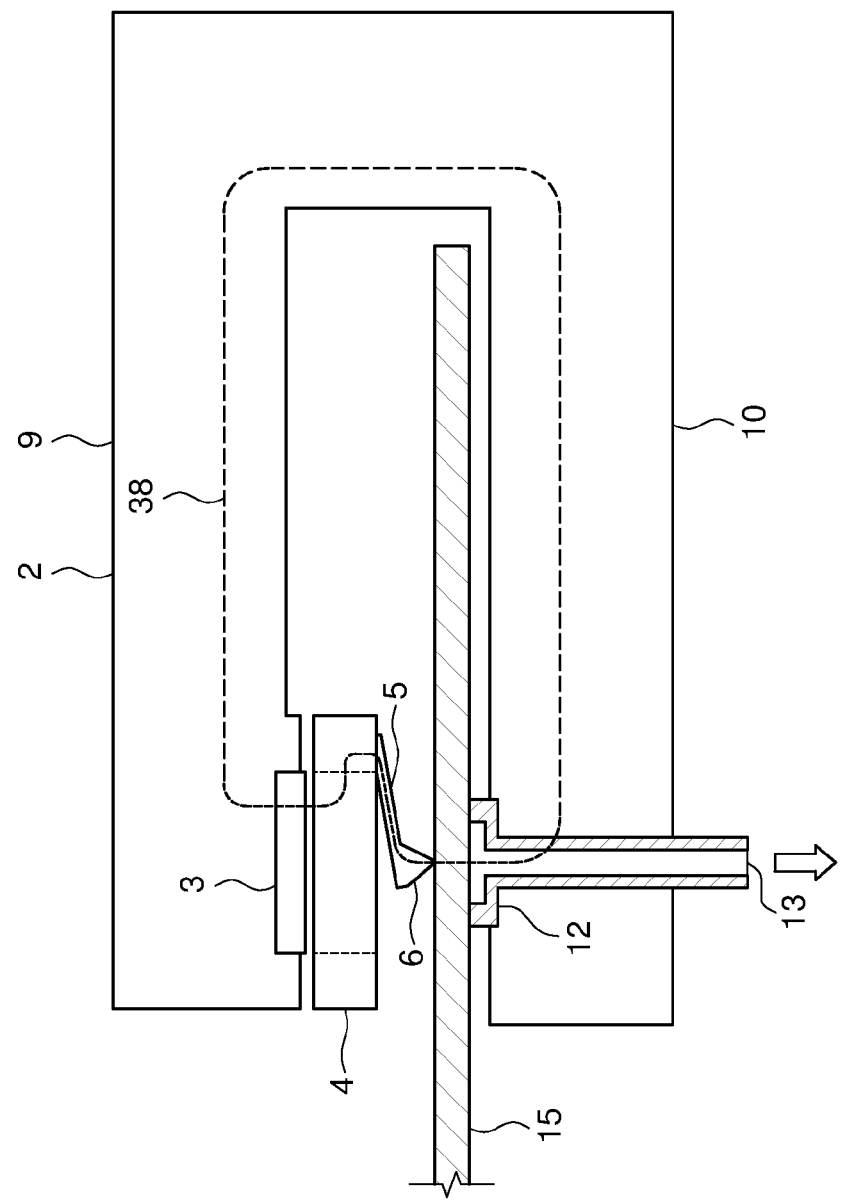
FIG. 3 schematically illustrates an enlarged view of the metrology loop in a microscopy system of the present invention.

FIG. 3 is a schematic illustration of the metrology loop 38 in the embodiment of FIG. 1. In FIG. 3, only the metrology frame 2 with upper arm 9 and lower arm 10 is illustrated. The external positioner 25 and a sample support structure 20 are not illustrated. The metrology loop 38 runs from the probe tip 6 via the clamp 12 and the lower arm 10 towards the upper arm 9 of the metrology frame 2, through the actuator 3 and the sensor head 4 and through the probe arm of probe 5 back to the probe tip. Clamping of the wafer 15 by means of the clamp 12 directly to the metro frame 2 prevents a number of sources of inaccuracy in the lower arm 10 of the metrology frame 2. Also, as a result of clamping the wafer 15 directly underneath the probe tip 6 and providing only local clamping in the direct vicinity of the measurement area, fixes the center of thermal expansion to the clamping area provided by the clamp 12, and excludes errors due to thermal expansion of the metrology frame (thermal expansion in the upper arm 9 is compensated by an equal amount in the lower arm 10). Using a plurality of burls 22, the clamping force may be controlled such that the lateral stiffness of the clamp 12 is larger than the lateral stiffness of the wafer 15 resting on the burls. To this end, the tips of the burls may for example be made of a smooth and rigid material to decrease their lateral stiffness with respect to the wafer. The burls 22 will in that case only support the wafer in the z-direction (gravitational) but not in the x and y directions (slipping is allowed in these directions). By at the same time clamping with a sufficient suction force through clamp 12, the wafer 15 is, at clamp 12, fixed in each direction x, y and z with sufficient lateral stiffness to prevent slipping with respect to the clamp 12. This fixes the sensor of thermal expansion.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . ." should be read as: "component configured for . . ." or "member constructed to . . ." and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A scanning probe microscopy system for mapping nanostructures on a surface of a sample, the system comprising:

a metrology frame;

a sensor head including a probe tip; and an actuator for scanning the probe tip relative to the surface of the sample for mapping of the nanostructures, wherein the system comprises a clamp for clamping the sample, wherein the clamp is fixed to the metrology frame, wherein the clamp is arranged underneath the sensor head, wherein the clamp is arranged for locally clamping the sample in a clamping surface area of a further surface of the sample opposite the surface of the sample scanable by the probe tip, the clamping surface area being smaller in size than the further surface of the sample such as to clamp the sample using only a portion of the further surface of the sample, wherein the system further comprises a sample support structure for supporting the sample, wherein the sample support structure comprises a plurality of support struts, wherein the clamp is arranged for clamping at a first lateral stiffness, and wherein the support struts are arranged for supporting the sample at a second lateral stiffness lower than the first lateral stiffness.

2. The scanning probe microscopy system according to claim 1, wherein the clamp is arranged underneath the sensor head such that, during a scanning carried out by operating the actuator, a measurement axis through the probe tip and transverse to the surface of the sample can intersect the clamping surface area.

3. The scanning probe microscopy system according to claim 1, wherein the clamp has a size taken from the group consisting of:

the clamping surface area of the further surface of the sample is a same size as an area to be scanned on the surface of the sample in use for mapping of said nanostructures; and the clamping surface area of the further surface of the sample has a diameter in cross section within a range between 1 millimeter and 60 millimeters.

4. The scanning probe microscopy system of claim 3 wherein the clamping surface area has a diameter between 20 millimeters and 50 millimeters.

5. The scanning probe microscopy system of claim 3 wherein the clamping surface area has a diameter between 25 millimeters and 40 millimeters.

6. The scanning probe microscopy system according to claim 1, wherein the support struts are arranged on a sample support structure such as to support the sample outside the clamping area.

7. The scanning probe microscopy system according to claim 1, wherein the support struts include at least one of the group consisting of: support burls, support knobs, flexible support poles, and rigid support poles.

8. A scanning probe microscopy system according to claim 1, wherein the system further comprises a sample positioner for positioning of the sample on the clamp,
wherein the sample positioner is external to a metrology loop,
wherein the metrology loop is a virtual path going from the clamping surface area, via the clamp and the metrology frame, to the sensor head and the probe tip.

9. A scanning probe microscopy system according to claim 8, wherein the sample positioner is external to the sample support structure and separated therefrom.

10. A scanning probe microscopy system according to claim 8, wherein the sample positioner comprises a robot arm for positioning the sample on the sample support structure.

11. A scanning probe microscopy system according to claim 8, further comprising a sample support structure for supporting the sample, wherein the sample support structure comprises one or more lifting pins enabling lifting of the sample such as to allow gripping of the sample by the sample positioner.

12. A scanning probe microscopy system according to claim 1, wherein the clamp is of a material taken from the group consisting of:
a material having either a same or at least a similar thermal expansion coefficient as the sample, and
a silicon carbide material.

13. A scanning probe microscopy system according to claim 1, wherein the clamp is a suction clamp for clamping the sample by suction force.

14. A scanning probe microscopy system according to claim 1, wherein the sample support structure is external to the metrology frame.

15. A metrology frame structurally configured for incorporation into a scanning probe microscopy system for mapping nanostructures on a surface of a sample,
wherein the system further comprises:
a sensor head including a probe tip, and
an actuator for scanning the probe tip relative to the surface of the sample for mapping of the nanostructures,
wherein the metrology frame includes a clamp for clamping the sample, wherein the clamp is arranged underneath the sensor head,
wherein the system further comprises a sample support structure for supporting the sample,
wherein the sample support structure comprises a plurality of support struts,
wherein the clamp is arranged for clamping at a first lateral stiffness, and wherein the support struts are arranged for supporting the sample at a second lateral stiffness lower than the first lateral stiffness.

16. The metrology frame of claim 15 wherein the clamp is arranged for locally clamping the sample at a clamping surface area of a further surface of the sample opposite the surface of the sample scanable by the probe tip, the clamping surface area being smaller in size than the lower surface of the sample such as to clamp the sample using only a portion of the further surface of the sample.

* * * * *